(12) United States Patent
Shih

(10) Patent No.: US 12,514,322 B2
(45) Date of Patent: Jan. 6, 2026

(54) FACE GUARD FOR USE IN BALL GAME AND METHOD FOR MAKING THE SAME

(71) Applicant: YU HSUN ENTERPRISE CO., LTD., New Taipei (TW)

(72) Inventor: Jung-Tso Shih, New Taipei (TW)

(73) Assignee: YU HSUN ENTERPRISE CO., LTD., New Taipei (TW)

( * ) Notice: Subject to any disclaimer, the term of this patent is extended or adjusted under 35 U.S.C. 154(b) by 730 days.

(21) Appl. No.: 17/885,369

(22) Filed: Aug. 10, 2022

(65) Prior Publication Data

US 2024/0049829 A1 Feb. 15, 2024

(51) Int. Cl.
*B23K 20/02* (2006.01)
*A42B 3/20* (2006.01)

(52) U.S. Cl.
CPC ............. *A42B 3/20* (2013.01); *B23K 20/028* (2013.01)

(58) Field of Classification Search
CPC .... B23K 20/028; B23K 11/002; B23K 11/02; A42B 3/20
USPC ....................................... 148/526
See application file for complete search history.

(56) References Cited

U.S. PATENT DOCUMENTS 2,525,862 A * 10/1950 Carpenter ............ B23K 11/043
219/101
6,497,773 B1 * 12/2002 Shih ........................ B21F 27/12
148/528

FOREIGN PATENT DOCUMENTS

JP 2001030081 A * 2/2001

OTHER PUBLICATIONS

Se Eisaku [JP2003301248A] (machine translation) (Year: 2003).*
Yashiro Katsuji et.al. [JP2001030081A](machine translation) (Year: 2001).*

* cited by examiner

*Primary Examiner* — Sally A Merkling
*Assistant Examiner* — Nazmun Nahar Shams
(74) *Attorney, Agent, or Firm* — MUNCY, GEISSLER, OLDS & LOWE, P.C.

(57) ABSTRACT

A method for making a face guard for use in a ball game includes: providing a specific material; annealing the material by first maintaining a temperature between 410 and 430° C. for 3 hours and then lowering the temperature by about 30° C./hour; cutting the annealed material into a main-body member and plural supporting members; butt-joining the two ends of the main-body member by applying a specific pressure to the two ends; welding the supporting members to the main-body member to form a face guard body; performing a T4 heat treatment on the face guard body by first maintaining a temperature between 450 and 550° C. for 1.5 hours and then quenching for 7 seconds; performing a T6 heat treatment on the face guard body by first maintaining a temperature between 100 and 120° C. for 24 hours and then cooling by air; and performing an anodizing surface treatment on the face guard body.

8 Claims, 4 Drawing Sheets

FACE GUARD FOR USE IN BALL GAME AND METHOD FOR MAKING THE SAME

BACKGROUND OF THE INVENTION

1. Technical Field

The present invention relates to the technical field of face guards. More particularly, the invention relates to a method for making a face guard for use in a ball game and to a ball-game face guard made by the method. The method includes annealing a specific material at a specific temperature, applying a special time control arrangement, and performing hardening treatments in order to obtain a high-quality face guard that can be used in a ball game, has high strength, and is highly protective.

2. Description of Related Art

Ball games are fun and can train a player's body and mind. During a ball game, however, it is of great importance to ensure each player's safety, and this is why face guards are used in certain ball games for the sake of personal safety. In a baseball game, for example, the catcher wears a face guard to protect their face from being hit by a ball.

A conventional face guard is made by the following steps: 1) material shaping: rod-like and/or curved iron/steel members of appropriate lengths and thicknesses are cut into shape in order to be connected together as the basic members of the face guard; 2) welding: the aforesaid members are welded together by electric welding or oxy-acetylene welding so as to form the web-like structure of the face guard; and 3) coating: after an anti-rusting treatment, the welded face guard is immersed into plastic powder so that once the powder is cured, a plastic coating is formed on the surface of the face guard.

It can be known from the above that the conventional face guard is welded after quenching. Thus, the method for making the conventional face guard and the face guard made by the method still leave something to be desired and have the following drawbacks:

First, the conventional face guard is made of iron/steel and is therefore heavy, and it is not easy but physically demanding for a player to wear such a heavy face guard during a game. Besides, iron rusts easily.

Second, the conventional face guard is made by a conventional welding method, which not only is relatively labor-intensive and hence incurs a relatively high labor cost, but also may result in a high fraction defective.

Third, the conventional face guard has insufficient surface strength and internal shock-absorbing ability due to a lack of special treatment of the face guard material.

BRIEF SUMMARY OF THE INVENTION

To solve the problems of the foregoing method for making the conventional face guard and of the face guard made by the method, the present invention provides an improved method for making a face guard, wherein the steps of the method have been improved in comparison with the prior art. The method of the invention entails the use of a specific material, such as an aluminum alloy. To begin with, the specific material of which the face guard is to be made is annealed and then cut into an appropriate number of members. Then, the members are subjected to hardening treatments in order to have desirable hardness and toughness, the objective being to produce a lightweight, high-strength, highly protective, and high-quality face guard.

The method of the present invention for making a face guard for use in a ball game includes the following steps: providing a specific material; annealing the specific material by first keeping the specific material at a constant temperature between 410 and 430° C. for 3 hours and then cooling the specific material at a temperature reduction rate of about 30° C./hour in order for the specific material to have a fixed shape; cutting the annealed specific material into a main-body member and a plurality of supporting members; butt-joining the two ends of the main-body member by a cold welding process in which a specific pressure is applied to the two ends of the main-body member to join the two ends together; welding the supporting members to the main-body member in such a way that the supporting members are arranged at intervals, thereby forming a face guard body; performing a T4 heat treatment on the face guard body by first keeping the face guard body at a first selected constant temperature between 450 and 550° C. for 1 hour and 30 minutes and then quenching the face guard body for 7 seconds; performing a T6 heat treatment on the face guard body by first keeping the face guard body at a second selected constant temperature between 100 and 120° C. for 24 hours and then cooling the face guard body by air; and performing a surface treatment, such as an anodizing surface treatment, on the face guard body.

In some embodiments, the quenching uses a water temperature not higher than 30° C.

In some embodiments, the specific material is one of an aluminum alloy, a magnesium alloy, a molybdenum alloy, a copper alloy, and an iron alloy.

In some embodiments, the main-body member has a circular cross section.

In some embodiments, each supporting member has a circular cross section.

In some embodiments, the welding is high-efficiency electric resistance welding.

In some embodiments, the specific pressure is 100 kg/cm$^2$.

In some embodiments, the intervals at which the supporting members are arranged are 40 mm to 50 mm.

The present invention also provides a face guard for use in a ball game, wherein the face guard is made by the method disclosed herein for making a face guard for use in a ball game.

DETAILED DESCRIPTION OF THE INVENTION

In order for the examiner to better understand the objectives, features, and effects of the present invention, a preferred embodiment of the invention is detailed below with reference to the accompanying drawings.

Figure 1:
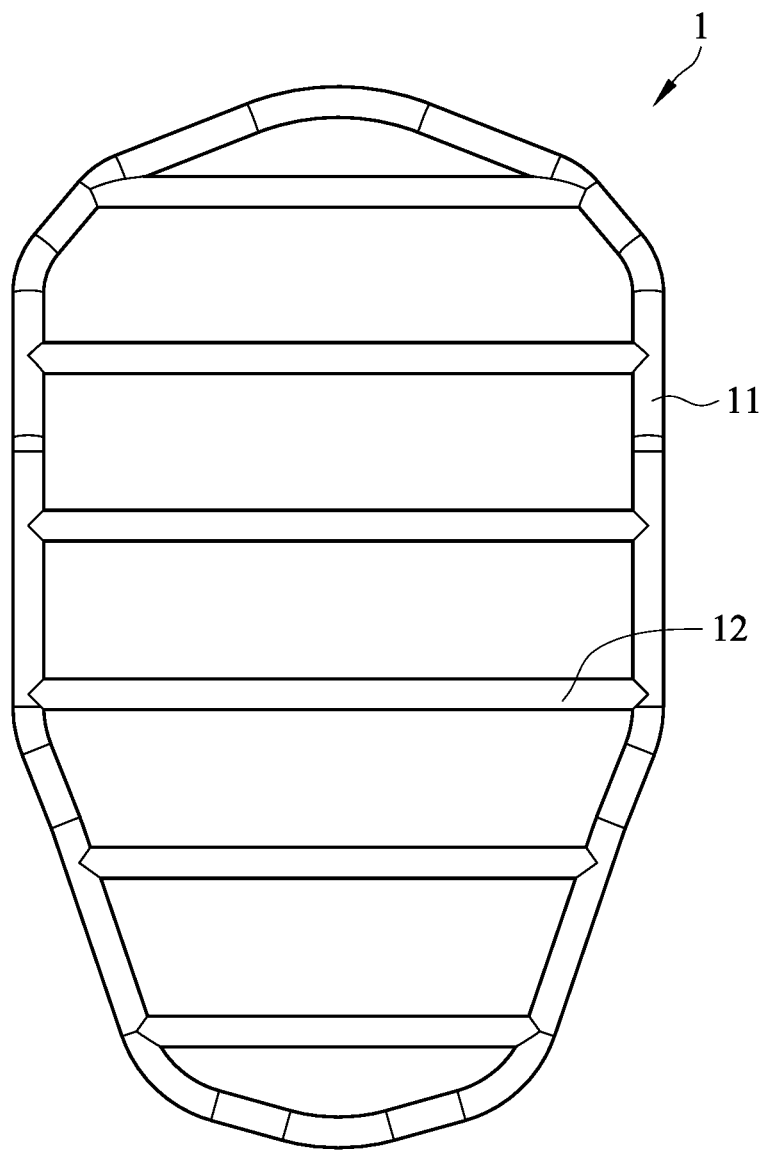
FIG. 1 is a front view of the face guard body in a preferred embodiment of the present invention.

Please refer to FIG. 1 for a front view of the face guard body in a preferred embodiment of the present invention. The face guard body 1 shown in FIG. 1 is a face guard for use in a common ball game and includes a main-body member 11 (e.g., a straight or curved member) and a plurality of supporting members 12 (e.g., a plurality of straight or curved members). The main-body member 11 in this embodiment has an annular shape (e.g., a shape similar to the front-side contour of a human face). The supporting members 12 are welded to the main-body member 11 in such a way that the supporting members 12 are arranged at intervals. The main-body member 11 has a circular cross section, and so do the supporting members 12. It is understood, however, that the cross-sectional shape of the main-body member 11 and of the supporting members 12 is not necessarily circular and may be polygonal instead.

Figure 2:
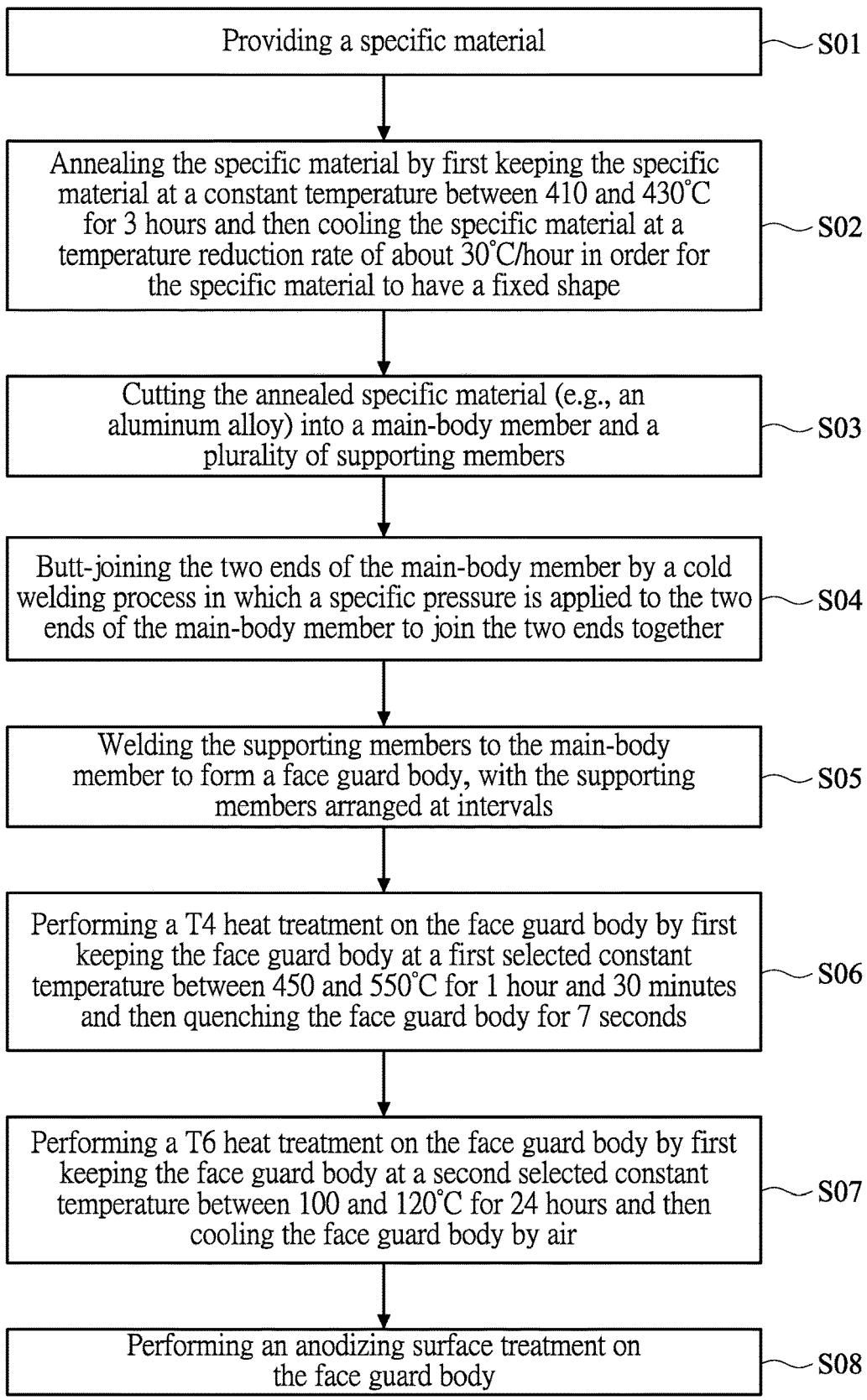
FIG. 2 is the flowchart of the method according to the preferred embodiment of the invention.

The method for making the face guard body 1 is detailed below with reference to FIG. 2 in conjunction with FIG. 1, with FIG. 2 showing the flowchart of the method according to the preferred embodiment of the present invention.

First of all, a specific material is provided (step S01). For example, the specific material may be one of an aluminum alloy, a magnesium alloy, a molybdenum alloy, a copper alloy, and an iron alloy. In this embodiment, an aluminum alloy is used because of its lightweight and resistance to rust. An additional material such as copper or molybdenum may be added as needed in order to endow the specific material with greater strength or other desirable properties.

Next, the specific material is annealed by first keeping the specific material at a constant temperature between 410 and 430° C. for 3 hours and then cooling the specific material at a temperature reduction rate of about 30° C./hour in order for the specific material to have a fixed shape (step S02).

Following that, the annealed specific material (aluminum alloy) is cut into the main-body member 11 and the plurality of supporting members 12 (step S03) as the basic elements of which the face guard is composed.

The two ends of the main-body member 11 are then butt-joined by a cold welding process in which a specific pressure is applied to the two ends of the main-body member 11 to join the two ends together (step S04). The specific pressure may be, for example, 100 kg/cm² and can be changed according to the type of the specific material and the thicknesses of the aluminum alloy members (i.e., the main-body member 11 and the supporting members 12).

Figure 3:
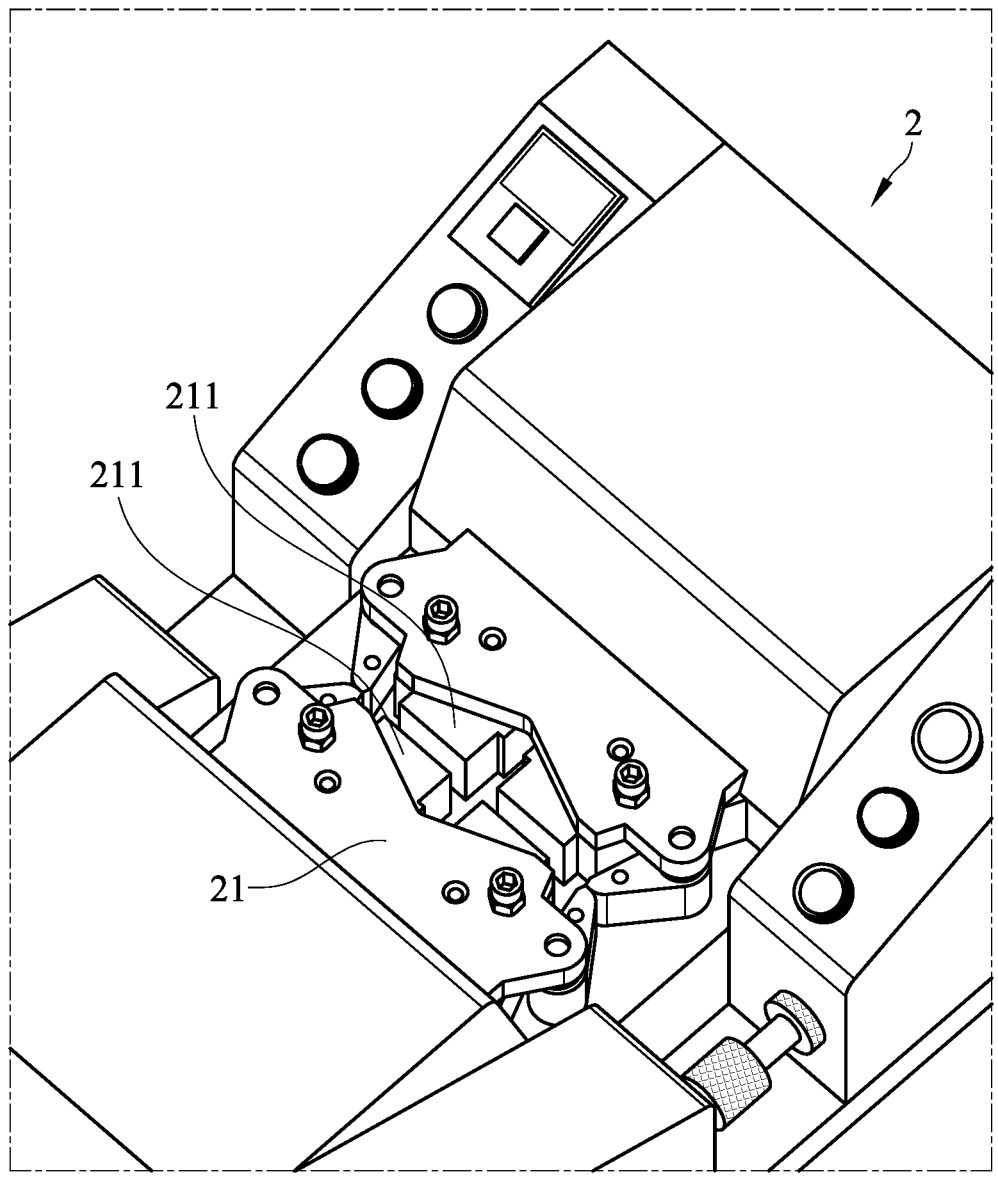
FIG. 3 shows how a cold welding process is performed according to the preferred embodiment of the invention.

Please refer to FIG. 3 in conjunction with FIG. 1 and FIG. 2, with FIG. 3 showing how the cold welding process is performed according to the preferred embodiment of the present invention. The cold welding machine 2 shown in FIG. 3 has a jig 21 for cold welding. Once the two ends of the main-body member 11 are placed in the jig 21, the specific pressure is applied to the two ends of the main-body member 11 in order for a change in atomic structure to take place at the two ends of the main-body member 11 and thereby join the two ends together.

Figure 4:
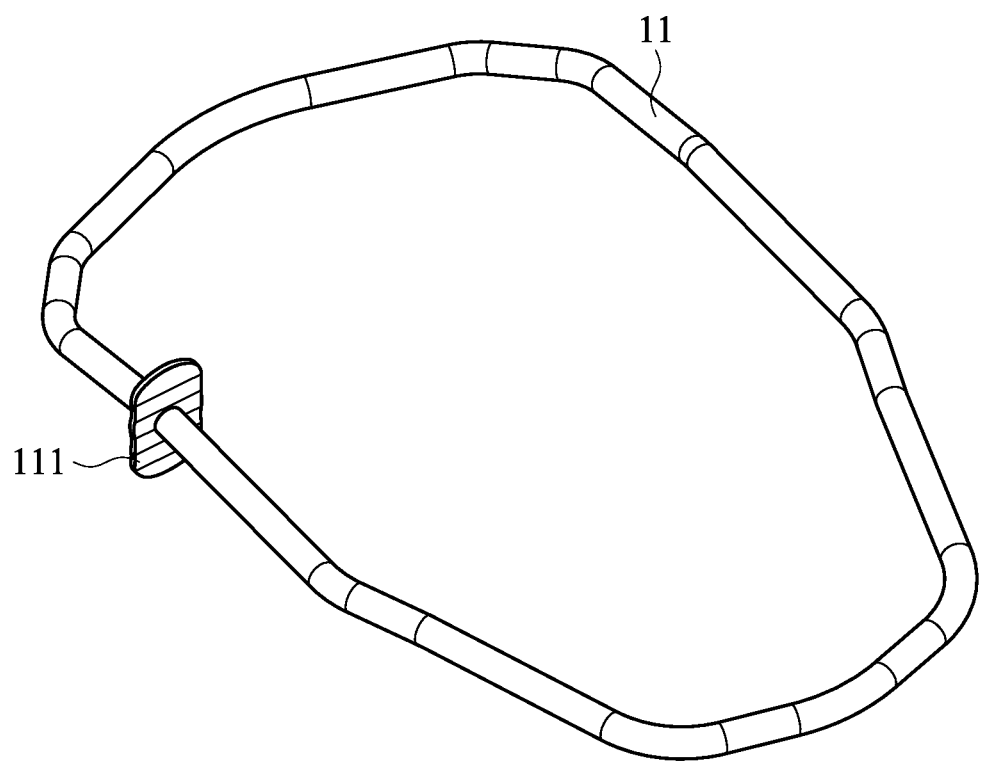
FIG. 4 shows the main-body member in the preferred embodiment of the invention after its two ends are cold-welded together.

Please refer to FIG. 4 in conjunction with FIG. 3, with FIG. 4 showing the main-body member in the preferred embodiment of the present invention after its two ends are cold-welded together. Immediately after the two ends of the main-body member 11 are joined by the cold welding process, there will be residual material 111 at the joint. The residual material 111 can be removed by, for example, breaking it off manually (or by a machine instead). The jig 21 includes two sets of welding heads 211 that are offset from each other so that the two ends of the main-body member 11 can be cold-welded in an offset manner to increase the robustness of the joint.

Referring back to FIG. 1 and FIG. 2, the supporting members 12 are welded to the main-body member 11 to form the face guard body 1, with the supporting members 12 arranged at intervals (step S05). The intervals at which the supporting members 12 are arranged can be changed according to practical needs and may range from 40 mm to 50 mm for example. The method by which the supporting members 12 are welded to the main-body member 11 may be high-efficiency electric resistance welding. The use of electric resistance welding helps reduce occupational injury, requires a relatively short processing time, and contributes to high welding precision.

The face guard body 1 is then subjected to a T4 heat treatment in which the face guard body 1 is kept at a first selected constant temperature between 450 and 550° C. for 1 hour and 30 minutes and then quenched for 7 seconds (step S06). The first selected constant temperature can be changed according to the type of the specific material. The phrase "kept at a constant temperature" refers to being kept within ±3° C. of that temperature in actual operation (inside the furnace). The water temperature used for quenching is preferably not higher than 30° C.

In the manufacturing process described above, the face guard body 1 is quenched in its entirety (step S06) after the cold welding step (step S04) and the welding step (step S05). Only by doing so can the face guard body 1 be spared the formation of soft spots.

Next, the face guard body 1 is subjected to a T6 heat treatment in which the face guard body 1 is kept at a second selected constant temperature between 100 and 120° C. for 24 hours and then cooled by air (step S07). The second selected constant temperature can be changed according to the type of the specific material. The phrase "kept at a constant temperature" refers to being kept within ±3° C. of that temperature in actual operation. The desired material properties can be obtained despite the ±3° C. deviation.

It should be pointed out that the symbols T4 and T6 used in the terms "T4 heat treatment" and "T6 heat treatment" are temper designations associated with heat treatment. T4 refers to a solution heat treatment followed by natural aging, whereas T6 refers to a solution heat treatment followed by artificial aging. The T4 heat treatment and the T6 heat treatment are techniques well known to a person skilled in the art and therefore will not be described in more detail.

Lastly, the face guard body 1 is subjected to a surface treatment (step S08). In this embodiment, for example, an anodizing surface treatment is performed. The surface treatment may alternatively be powder coating or polyethylene (PE) coating. In practice, step S08 may be followed by dying or plastic-wrapping the face guard body 1.

The foregoing manufacturing method of the present invention has the following advantages: (1) an aluminum alloy, which is not prone to rusting and is about one third as heavy as a conventional iron material, can be used as the specific material; and (2) experimental results have proved that the special annealing and quenching operations can lead to a tensile strength of 70000 psi or higher, a hardness of about 120 BHN, an elongation rate of 14% to 21%, and a yield strength of 60000 psi or higher. In short, a face guard made by the manufacturing method described above has much higher strength, and is therefore more protective, than its conventional counterparts.

While the present invention has been disclosed above by way of a preferred embodiment, the embodiment is not intended to be restrictive of the scope of the invention. A person skilled in the art may change or modify the disclosed embodiment slightly without departing from the spirit or scope of the invention. All such changes and modifications made according to the technical contents disclosed herein shall be viewed as falling within the scope of the invention, which scope is defined by the appended claims.

What is claimed is:

1. A method for making a face guard for use in a ball game, comprising the steps of:
providing a specific material;
annealing the specific material by first keeping the specific material at a constant temperature, which is within a range of 41° and 430° C., for 3 hours and then cooling the specific material at a temperature reduction rate of about 30° C./hour in order for the specific material to have a fixed shape;
cutting the annealed specific material into a main-body member and a plurality of supporting members;
butt-joining two ends of the main-body member by a cold welding process, wherein the cold welding process comprises applying a specific pressure to the two ends of the main-body member in order to join the two ends together;
welding the supporting members to the main-body member in such a way that the supporting members are arranged at intervals, thereby forming a face guard body;
after applying the cold welding process to the main-body member and welding the supporting members to the main-body member, performing a T4 heat treatment on the face guard body by first keeping the face guard body at a first selected constant temperature between 45° and 550° C. for 1 hour and 30 minutes and then quenching the face guard body for 7 seconds;
performing a T6 heat treatment on the face guard body by first keeping the face guard body at a second selected constant temperature between 10° and 120° C. for 24 hours and then cooling the face guard body by air; and
performing a surface treatment on the face guard body.

2. The method of claim 1, wherein the quenching uses a water temperature not higher than 30° C.

3. The method of claim 1, wherein the specific material is one of an aluminum alloy, a magnesium alloy, a molybdenum alloy, a copper alloy, and an iron alloy.

4. The method of claim 1, wherein the main-body member has a circular cross section.

5. The method of claim 1, wherein each said supporting member has a circular cross section.

6. The method of claim 1, wherein the welding is electric resistance welding.

7. The method of claim 1, wherein the specific pressure is 100 kg/cm$^2$.

8. The method of claim 1, wherein the intervals at which the supporting members are arranged are 40 mm to 50 mm.

* * * * *